(12) United States Patent
Totani

(10) Patent No.: US 7,753,555 B2
(45) Date of Patent: Jul. 13, 2010

(54) VEHICLE-MOUNTED LED ILLUMINATION DEVICE

(75) Inventor: Tsutomu Totani, Nagoya (JP)

(73) Assignee: Beat-Sonic Co., Ltd., Aichi (JP)

( * ) Notice: Subject to any disclaimer, the term of this patent is extended or adjusted under 35 U.S.C. 154(b) by 260 days.

(21) Appl. No.: 12/148,690

(22) Filed: Apr. 22, 2008

(65) Prior Publication Data

US 2008/0259622 A1    Oct. 23, 2008

(30) Foreign Application Priority Data

Apr. 23, 2007   (JP) .............................. 2007-112619

(51) Int. Cl.
*B60Q 1/00* (2006.01)
*F21V 29/00* (2006.01)
*F21S 4/00* (2006.01)

(52) U.S. Cl. .................. 362/249.02; 362/487; 362/548; 362/640; 362/396

(58) Field of Classification Search ............ 362/249.02, 362/396, 487, 548, 640
See application file for complete search history.

(56) References Cited

U.S. PATENT DOCUMENTS 5,544,027 A * 8/1996 Orsano ........................ 362/105
7,153,008 B2 * 12/2006 Grote et al. .................. 362/487

FOREIGN PATENT DOCUMENTS

| JP | 10-85248 | 4/1998 |
| JP | 2000-100218 | 4/2000 |
| JP | 3120848 | 4/2006 |

* cited by examiner

*Primary Examiner*—Stephen F Husar
*Assistant Examiner*—James W Cranson
(74) *Attorney, Agent, or Firm*—William L. Androlia; H. Henry Koda

(57) ABSTRACT

An LED illumination device includes at least one LED plate including a plurality of light emitting diodes mounted on an upper surface of a flat substrate and a device body having a mouth ring engageable with an illumination device socket disposed at a predetermined installation location, the LED plate and the device body being connected to each other by an electrical cable. The LED plate has an underside formed with an applying portion. The device body has an outer surface provided with a receiving portion. The applying portion of the LED plate is detachably applied to the receiving portion of the device body.

2 Claims, 15 Drawing Sheets

VEHICLE-MOUNTED LED ILLUMINATION DEVICE

CROSS-REFERENCE TO RELATED APPLICATIONS

This application is based upon and claims the benefit of priority from the prior Japanese Patent Application No. 2007-112619, filed on Apr. 23, 2007, the entire contents of which are incorporated herein by reference.

BACKGROUND OF THE INVENTION

1. Field of the Invention

The present invention relates to an light emitting diode (hereinafter, "LED") illumination device using an LED.

2. Description of the Related Art

Japanese Registered Utility Model No. 3120848 discloses a vehicle-mounted indoor LED illumination device which can allow an LED illumination device to be built onto caps of various types of vehicle interior lights. The disclosed LED illumination device comprises an LED illumination device panel including a plurality of LEDs provided on a substrate and a connecting terminal including a cap engaging a socket and a connector. The LED illumination device panel and the connecting terminal are manufactured individually and connected to each other by a harness, thereby being connected as a connector.

However, the LED illumination device panel needs to be fixed to a housing which is provided with a socket for the illumination device and has a curved inner face serving as a reflector. In this case, the LED illumination device panel is screwed thereby to be fixed or attached directly to the reflector by adhesive or two-sided adhesive tape thereby to be fixed. As a result, the above-mentioned fixing manner has the following problem. Firstly, when screwed, the LED illumination device panel is bored. On the other hand, when an adhesive is used, the adhesive is applied directly to the housing or the like. Accordingly, once positioned to be fixed, the housing or the like cannot be re-positioned again.

Secondly, the housing for the illumination device also serves as a reflector which directs light beams irradiated from a light source in a predetermined direction. For this purpose, the housing has a curved inner face. When the LED illumination device panel is attached using a two-side adhesive tape, a gap is defined between the LED illumination device panel and the housing inner face, whereupon a sufficient securing force cannot be obtained.

Thirdly, when the LED illumination device panel is affixed directly to an installation place, there is a possibility that the plate material may be broken when exchanged. Thus, the LED illumination device panel cannot easily be exchanged.

Furthermore, when a fixing force is weak, the LED illumination device panel is sometimes detached from the installation place. In this case, there is a possibility that the connecting terminal may be pulled by the harness or the like such that the connecting terminal may be detached from the socket.

SUMMARY OF THE INVENTION

Therefore, an object of the present invention is to provide an LED illumination device in which an LED plate is affixed directly to a device body so that an interior of the housing is effectively used and the LED plate is detachably attachable to the device body so that fine adjustment can easily carried out after installation.

The present invention provides an LED illumination device comprising at least one LED plate including a plurality of LEDs provided on an upper surface of a flat substrate, the LED plate having an underside, a device body provided with a cap engageable with an illumination device socket provided at a predetermined installation location, the device body having an outer surface, the LED plate and the device body being connected to each other by an electrical cable, an applying portion formed on the underside of the LED plate, and a receiving portion formed on the outer surface of the device body, the applying portion of the LED plate being detachably applied to the receiving portion of the device body.

The applying portion provided on the LED plate is directly applied to the receiving portion formed individually from the LED plate and provided on the device body having a cap engageable with the illumination device socket previously provided in the illumination housing. Accordingly, even when the inner surface of the housing in which the illumination device socket is provided, the illumination device can be accommodated in the housing and fixed. Furthermore, since the applying portion is detachably attachable, the location of the illumination device can be fine adjusted.

Furthermore, the LED plate applied to the device body is fixed nearer to the center of the illumination device LED plates as compared with the case where the conventional LED illumination plate is fixed in the housing. Consequently, the space in the housing can more effectively be used as compared with the case where the LED illumination device is installed in an inner location.

In a preferred embodiment, the applying and receiving portions comprise a hook-loop fastener. Accordingly, the LED plate can be fixed to the device body more easily. Furthermore, the location of the LED plate can be adjusted after application. Still furthermore, vibration transmitted from the device body to the LED plate can be absorbed by the structure of the fastener.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 1:
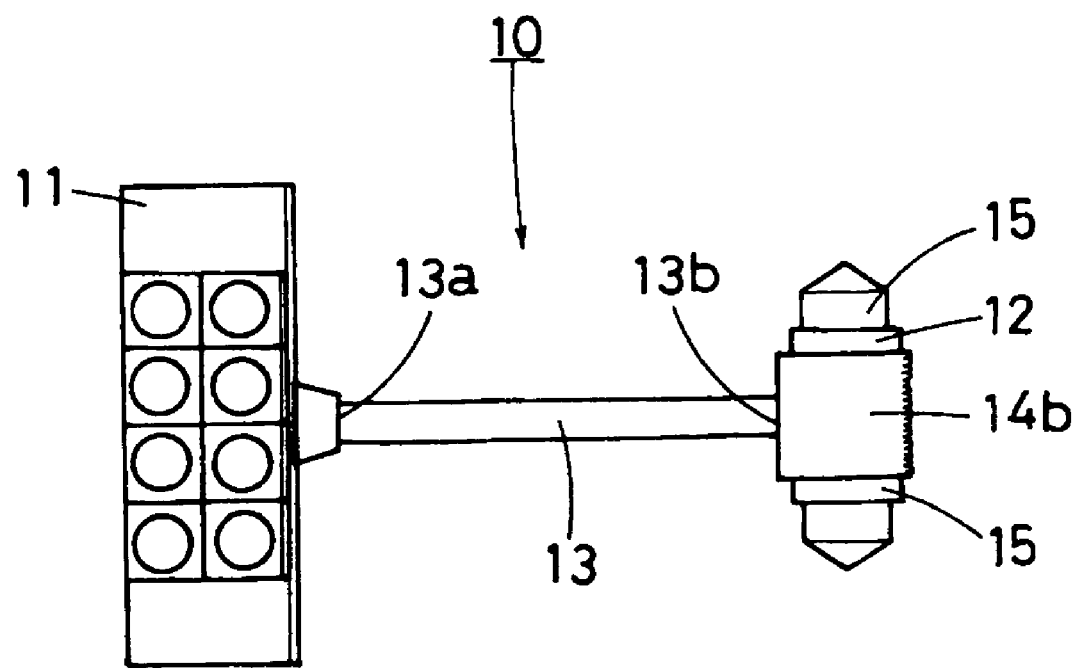
FIG. 1 is a plan view of an illumination device of a first embodiment.
Figure 2:
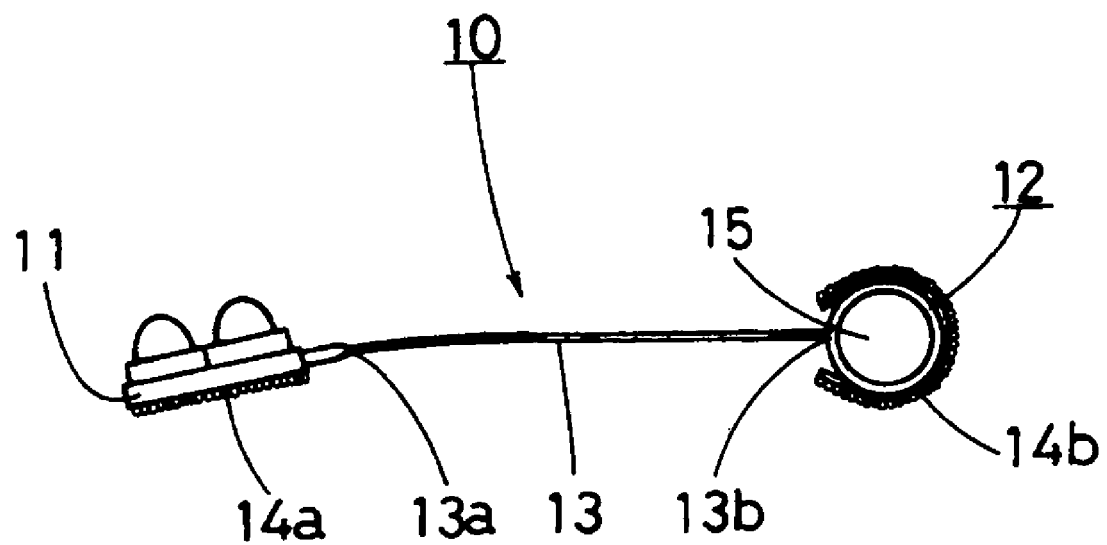
FIG. 2 is a side view of the illumination device.
Figure 3:
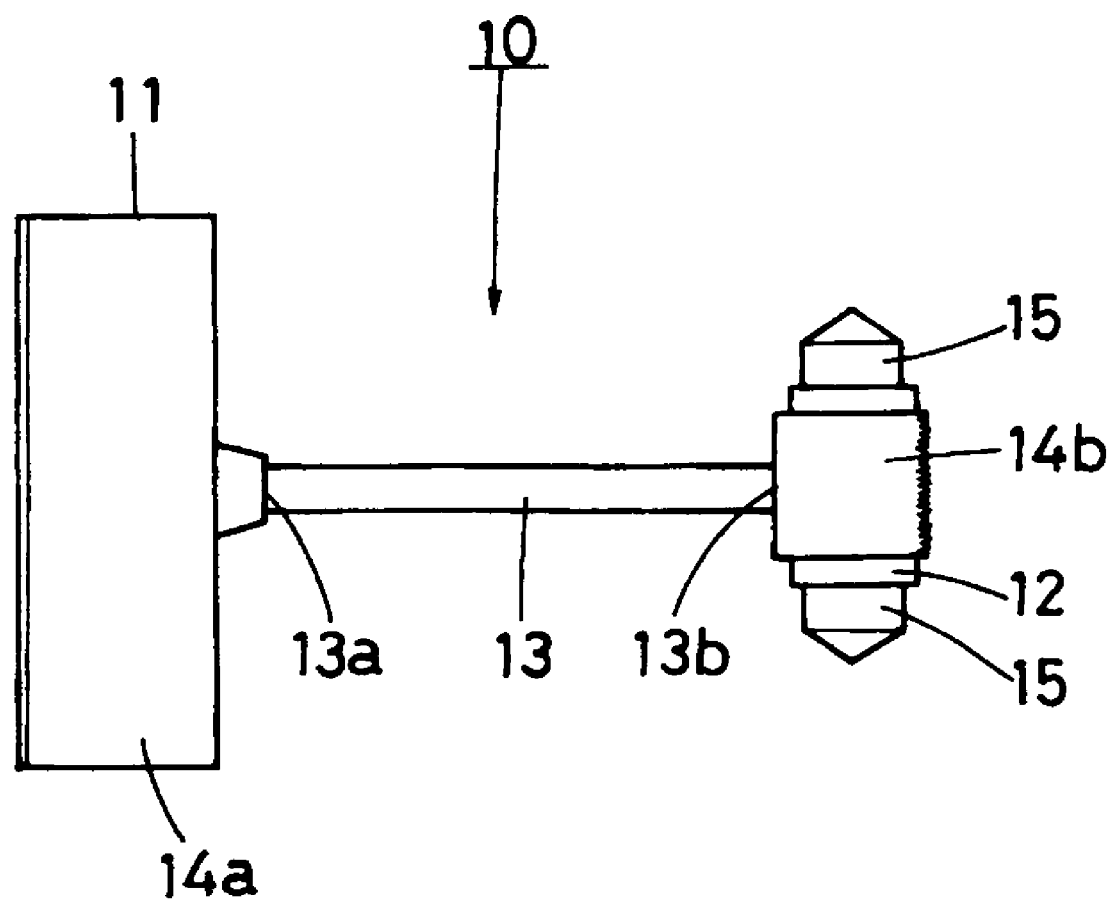
FIG. 3 is a bottom view of the illumination device.

Several embodiments of the present invention will be described with reference to the accompanying drawings. Referring to FIGS. 1 to 7, an LED illumination device 10 of a first embodiment is shown. The LED illumination device 10 comprises an LED plate 11 and a device body 12 both of which are connected to each other by an electrical cable 13 as shown in FIGS. 1 to 3. The LED plate 11 comprises a flat substrate and eight LEDs mounted on an upper surface of the LED plate 11 and arranged in two rows each of which is composed of four LEDs. The LED plate 11 has an underside on which are provided elements (not shown) such as resistances composing a rectifier circuit, control circuit, etc., diodes, integrated circuits and the like. Furthermore, a hook-loop fastener 14a is bonded to the entire underside of the LED plate 11 so as to cover the aforesaid elements. The electrical cable 13 has an end 13a secured to a predetermined portion of the LED plate 11.

The number of LEDs mounted on the LED plate 11 should not be limited to eight. Any number of LEDs may be mounted on the LED plate 11. Furthermore, emission colors and an emission pattern of the LEDs may be set desirably.

The device body 12 has two ends on which are provided bases 15 which engage sockets of the illumination device, respectively. Each cap 15 comprises a conical metal cap and a metal cylinder both of which are connected together. Each of the aforesaid sockets is previously provided in a housing of the illumination device. The housing has a curved inner surface serving as a reflector. A plurality of sizes of caps 15 are provided in accordance with specifications of sockets of illumination devices.

The electrical cable 13 has the other end 13b secured in the device body 12. Furthermore, when the LED plate 11 is small so that a location for the rectifier circuit, control circuit, etc. cannot be ensured, these elements may be provided in the device body 12. Furthermore, another hook-loop fastener 14b is bonded to an entire outer periphery of the device body 12.

Figure 4:
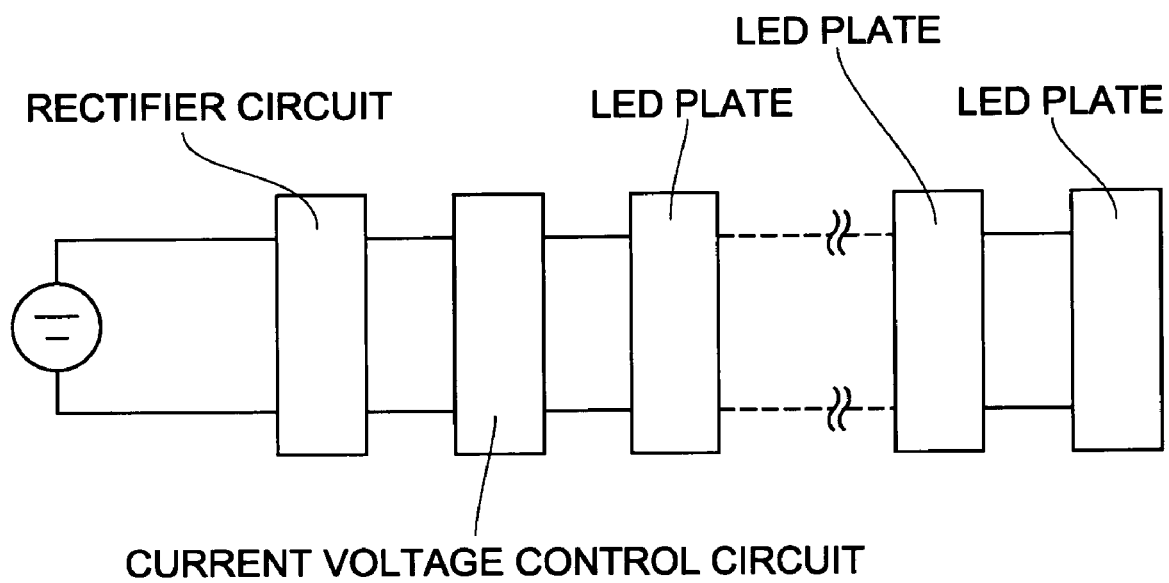
FIG. 4 is a schematic block diagram showing an electrical arrangement of the illumination device.
Figure 5:
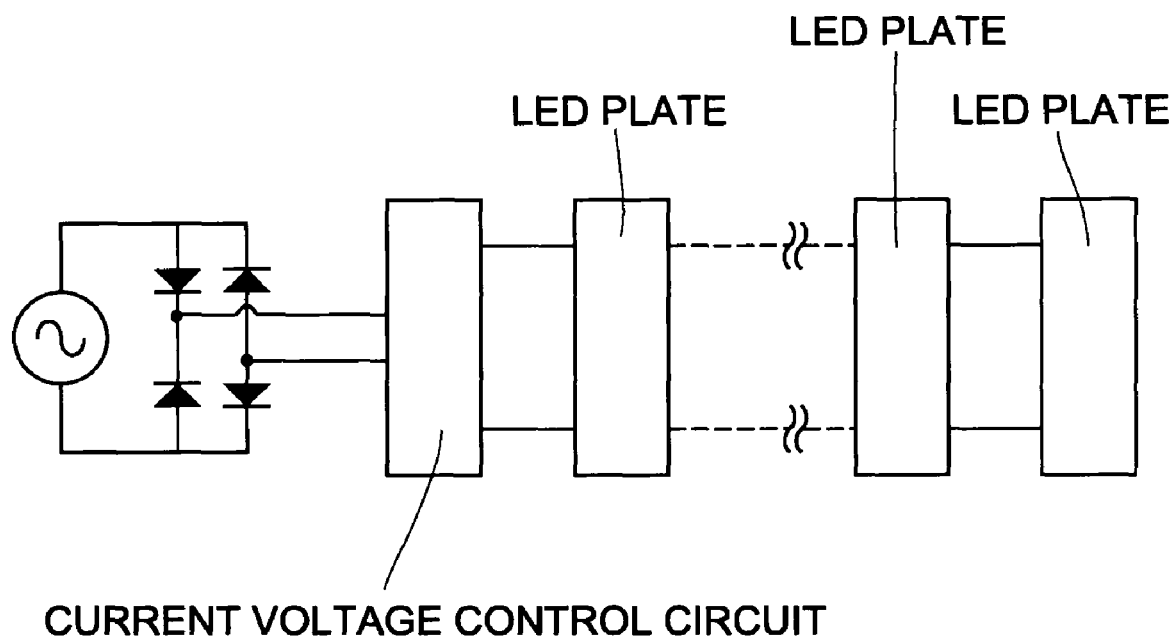
FIG. 5 is also a schematic block diagram showing another electrical arrangement of the illumination device.

FIGS. 4 and 5 are schematic block diagrams showing electrical arrangements of the illumination device respectively. DC power is supplied to the illumination device of FIG. 4, whereas AC power is supplied to the illumination device of FIG. 5. As shown in the figures, a plurality of LED plates 11 may be parallel connected, whereupon the number of LED plates 11 can be increased. Accordingly, when being connected to each other or one another, a plurality of LED plates 11 can be provided in the housing with irradiation directions being changed.

Figure 6:
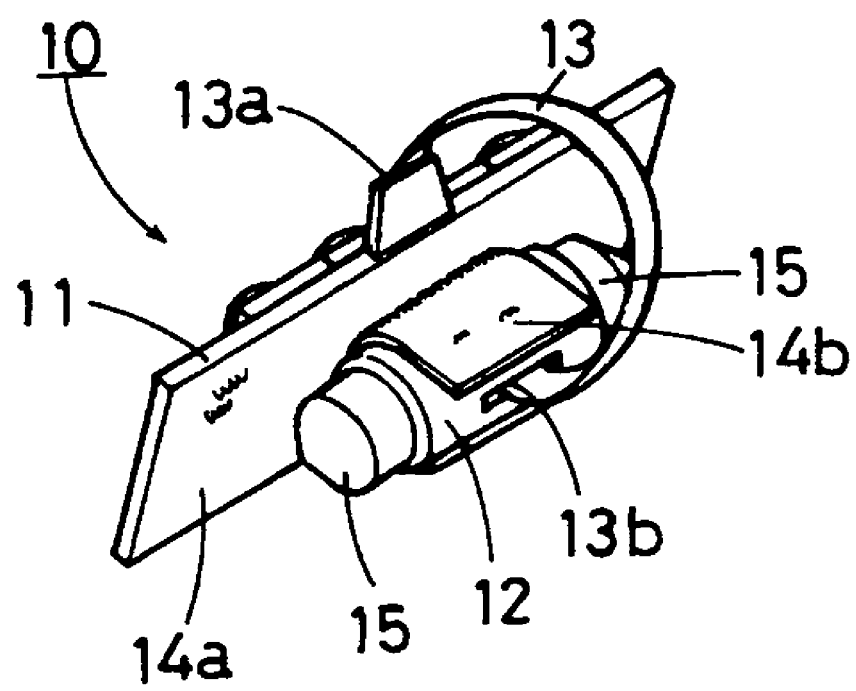
FIG. 6 is a perspective view of the illumination device, showing an example of use of the illumination device.
Figure 7:
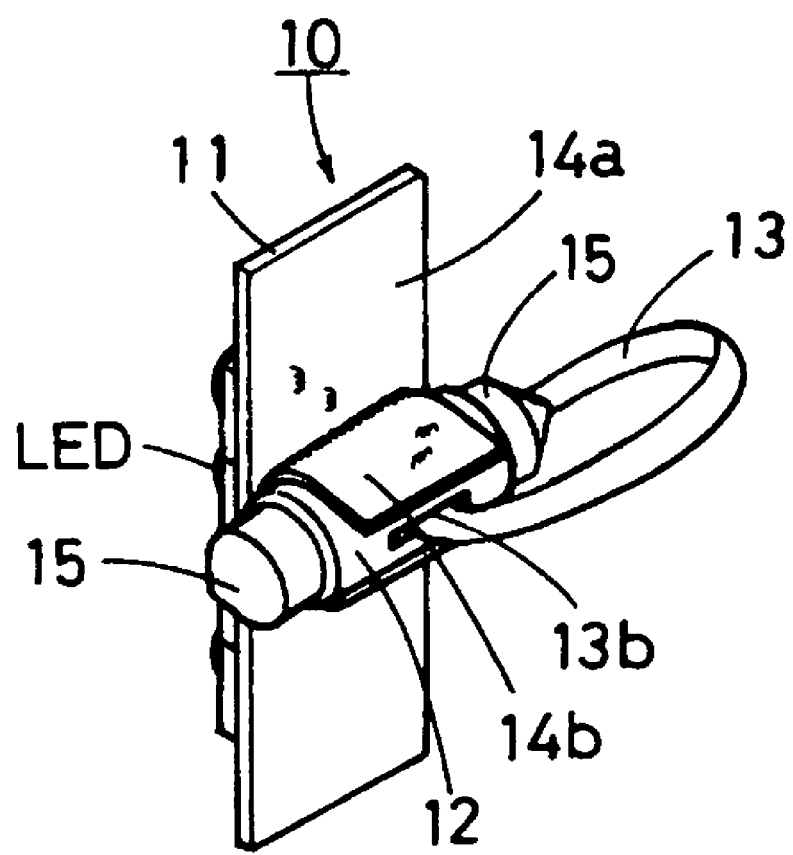
FIG. 7 is a perspective view of the illumination device, showing another example of use of the illumination device.

The LED illumination device 10 arranged as described above is used as follows. FIGS. 6 and 7 are perspective views of the LED illumination device 10, showing examples of use thereof. The cap 15 is locked to the socket previously provided in the illumination device housing, whereby the device body 12 is fixed. As shown in FIG. 6, the device body 12 and the LED plate 11 are disposed so that the lengthwise directions of the two correspond with each other, and the hook-loop fastener 14a of the LED plate 11 is attached to the hook-loop fastener 14b of the device body 12. Furthermore, the housing sometimes has a sufficient space in the axial direction with respect to the device body 12 depending upon the shape of the housing in which the device body 12 is to be enclosed although having less space in its lengthwise direction. In this case, the hook-loop fastener 14a of the LED plate 11 may be attached to the hook-loop fastener 14b of the device body 12 so that the lengthwise direction of the device body 12 crosses the lengthwise direction of the LED plate 11, as shown in FIG. 7.

The housing of the illumination device is generally formed so as to have an inverted bowl-shaped longitudinal section in order that light may efficiently be reflected on the housing. In the embodiment, the LED plate 11 is directly attached to the device body 12. Accordingly, the LED plate 11 is disposed in a space in the housing as compared with the conventional LED illumination device in which the LED plate is directly fixed or attached to the inverted bowl-shaped bottom of the housing. Consequently, a larger LED plate 11 can be disposed in the housing.

Furthermore, the LED plate 11 is detachably attached to the device body 12 using the hook-loop fasteners 14a and 14b. As a result, the LED plate 11 can easily be fixed to the device body 12 and at the same time, minute adjustment of the location, angle, etc. of the LED plate can readily be carried out after fixation. Additionally, minute oscillation is usually transmitted from the vehicle body through the housing or socket to the LED illumination device 10. The oscillation can be absorbed by the structure of the hook-loop fastener to some extent.

Figure 8:
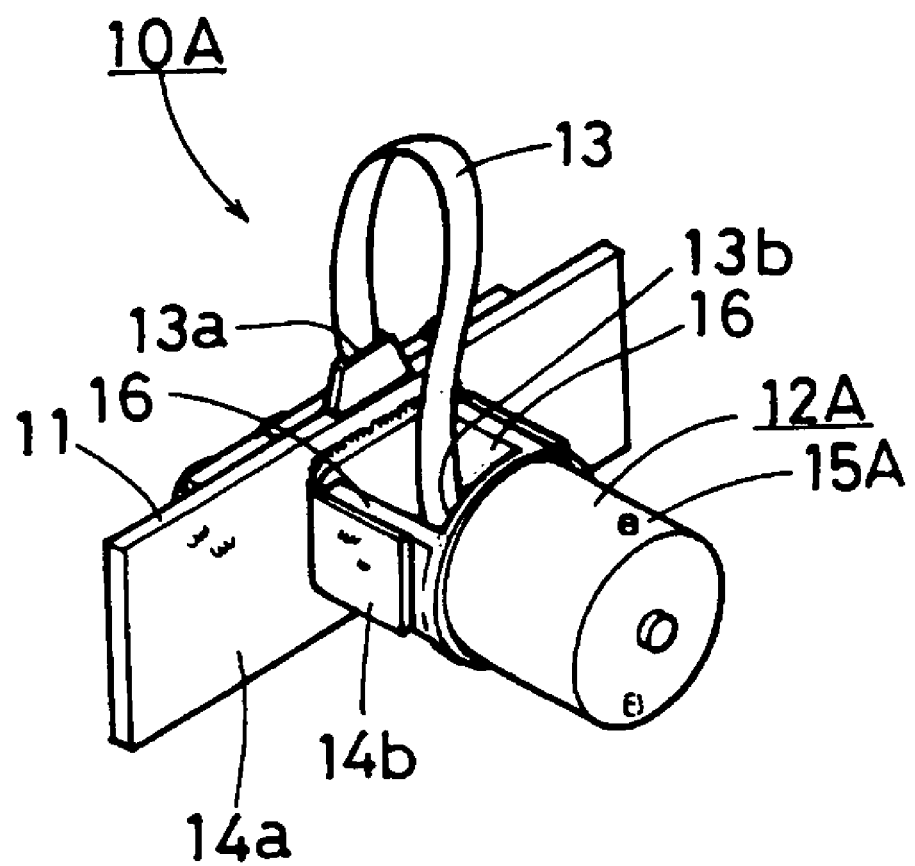
FIG. 8 is a perspective view of the illumination device of a second embodiment.
Figure 9:
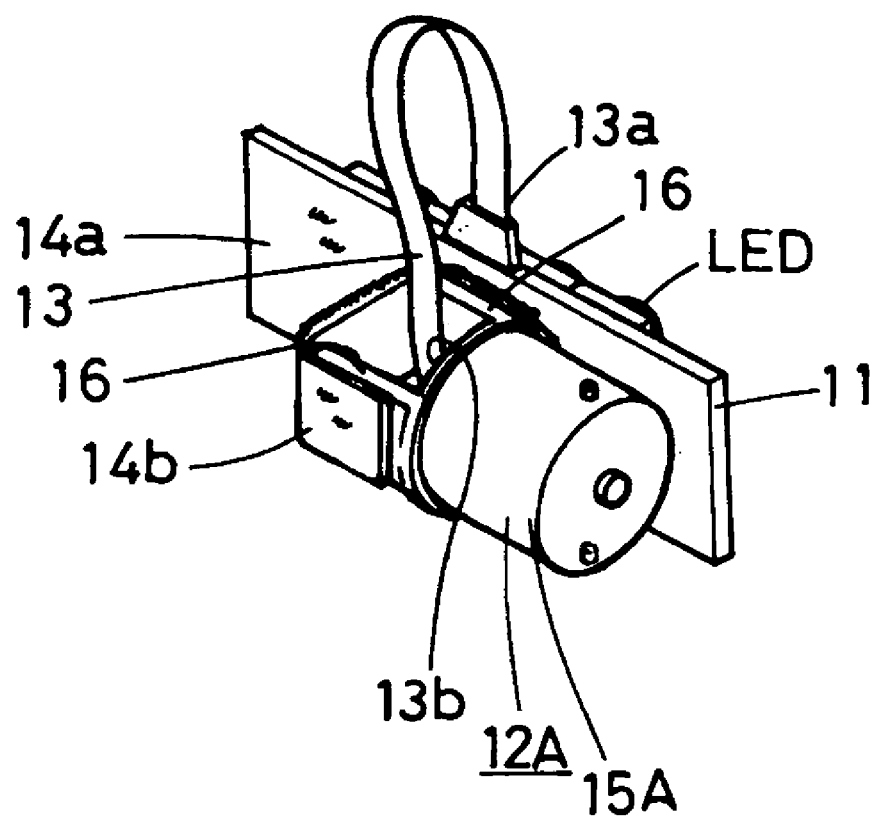
FIG. 9 is a perspective view of the illumination device, showing an example of use of the illumination device.
Figure 10:
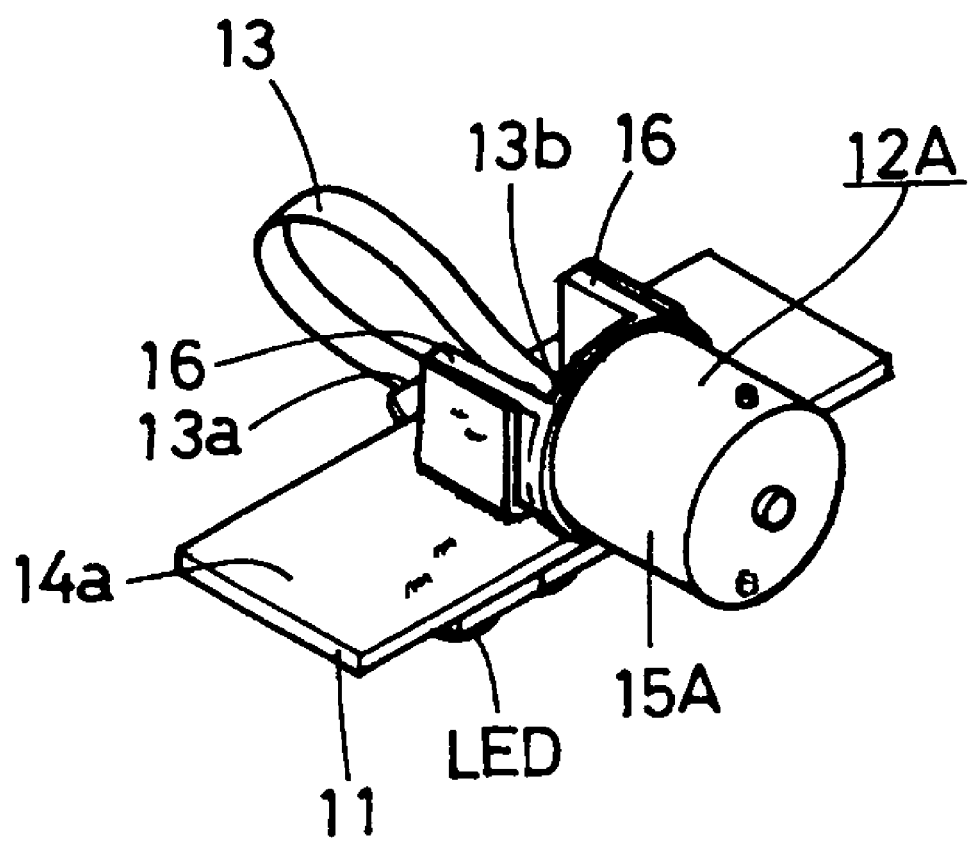
FIG. 10 is a perspective view of the illumination device, showing another example of use of the illumination device.

FIGS. 8 to 10 illustrate a second embodiment of the invention. The LED illumination device of the second embodiment is provided with a valve-like cap 15A mounted on the device body 12A as shown in FIG. 8. The LED plate 11 and the hook-loop fasteners 14a and 14b of the LED illumination device 10A are similar to those in the foregoing embodiment and accordingly, description of these components will be eliminated.

The device body 12A has a distal end provided with the valve-like cap 15A and a rear end. The electrical cable 13 has one end 13a connected to the LED plate 11 and the other end connected to the rear end of the device body 12A. The rear end of the device body 12A has a peripheral edge on which a pair of bases 16 comprising respective flat plates are mounted in order that the hook-loop fastener 14b may be attached to the device body 12A. The back side of the hook-loop fastener 14b as shown in the first embodiment is bonded to the outer surfaces of the bases 16. Accordingly, the cable 13 can be drawn out of either upper or lower side without interference with the hook-loop fastener 14b.

The LED illumination device 10A arranged as described above is used as follows. The hook-loop fastener 14b is bonded to the bases 16 into a generally C-shape. Any one of the right and left sides and the rear of the hook-loop fastener 14b is selected. FIG. 8 shows a case where the rear of the hook-loop fastener 14b is selected, and FIG. 9 shows a case where the right side is selected. The hook-loop fastener 14a of the LED plate 11 is attached to the selected side of the hook-loop fastener 14b in the same manner as in the first embodiment.

The hook-loop fastener 14b is disposed into the C-shape so as to cover the rear ends of the bases 16 as shown in FIGS. 8 and 9. However, a manner of bonding the hook-loop fastener 14b should not be limited. For example, as shown in FIG. 10, the lower ends of the bases 16 may be selected, and the hook-loop fastener 14b may be bonded into the C-shape so as to cover the selected end. Accordingly, although the direction of the LED illumination device 10 depends upon the direction of the socket with which the cap 15A is engaged, the LED plate 11 can be fixed so as to extend in the direction which provides a best illumination efficiency.

Figure 11:
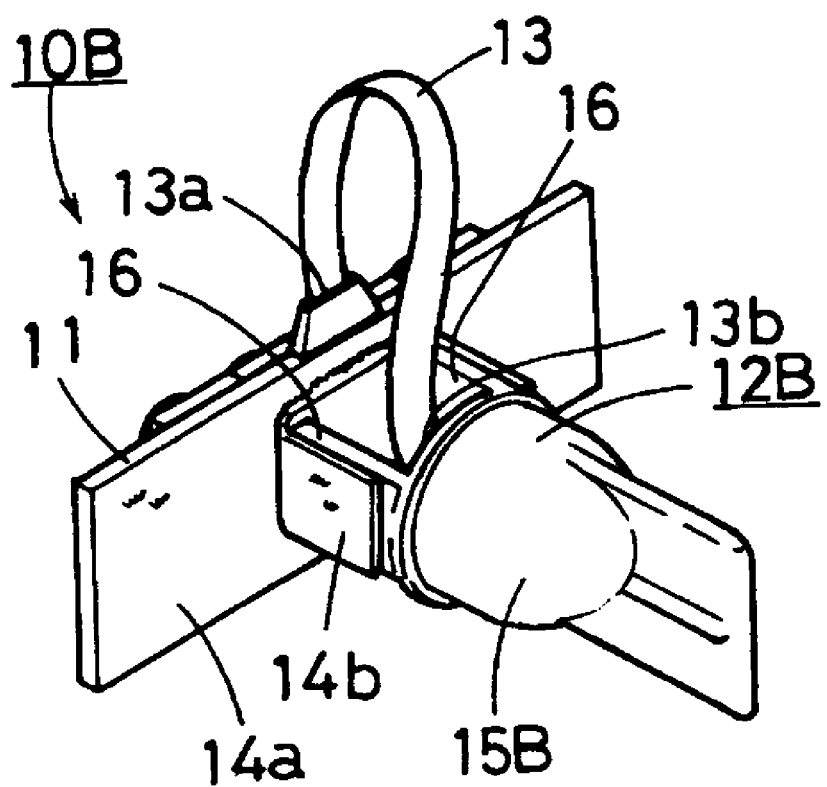
FIG. 11 is a perspective view of the illumination device of a third embodiment.

FIG. 11 illustrates a third embodiment of the invention. The LED illumination device 10B of the third embodiment is provided with a wedge cap 15B mounted on the device body 12B as shown in FIG. 11. Since the LED illumination device 10B is similar to the LED illumination device 10A of the second embodiment in the other respects, the description of the other respects of the LED illumination device 10B will be eliminated.

Figure 12:
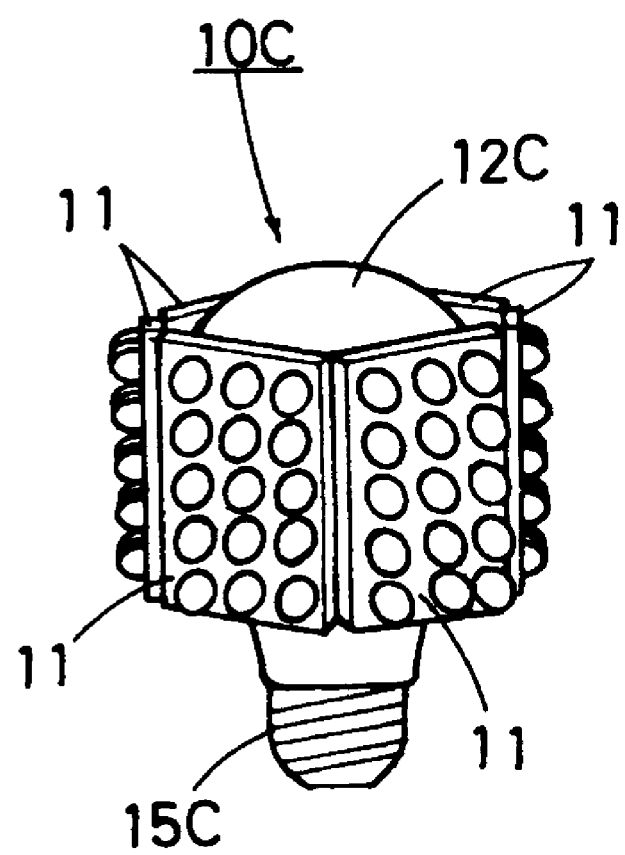
FIG. 12 is a perspective view of the illumination device of a fourth embodiment.
Figure 13:
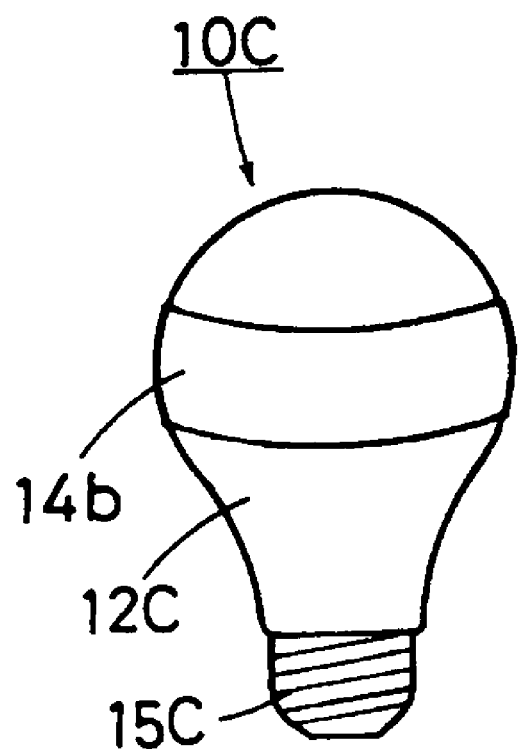
FIG. 13 is a perspective view of a device body formed in the semblance of a lamp bulb in the fourth embodiment.
Figure 14:
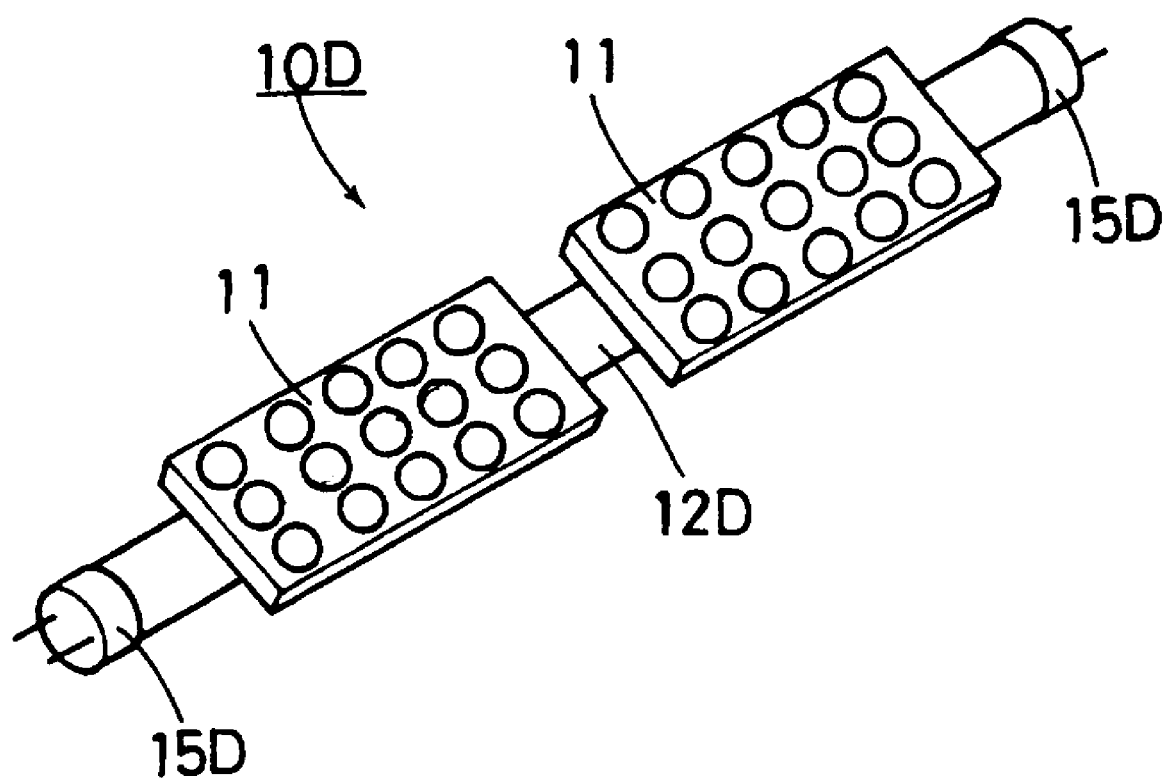
FIG. 14 is a perspective view of the illumination device of a fifth embodiment.

FIGS. 12 and 13 illustrate a fourth embodiment of the invention. The foregoing first to third embodiments describing the vehicle-mounted illumination devices. The LED illumination device 10C of the fourth embodiment is applied to an electrical bulb housing for use in ordinary residence. The LED illumination device 10C comprises the LED plate 11 and the device body 12C both of which are connected to each other by the electrical cable 13. The LED plate 11, the cable 13 and the hook-loop fasteners 14a and 14b of the LED illumination device 10C are similar to those in the foregoing embodiments and accordingly, description of these components will be eliminated.

The device body 12C is formed into a general shape of electrical bulb as shown in FIG. 13. The cap 15C has the same shape as the electrical bulb. As a result, the cap 15C is engageable with a socket for the electrical bulb. The device body 12C is made of a synthetic resin such as acrylic. The hook-loop fastener 14b is wound on and bonded to the device body 12C. The hook-loop fastener 14a of the LED plate 11 is attached to the hook-loop fastener 14b of the device body 12C, so that the LED illumination device 10C is comprised. A plurality of LED plates 11 may be connected to each other or one another as shown in FIGS. 4 and 5. Accordingly, plural LED plates 11 can be attached to the periphery of the device body 12C. Furthermore, the section of the device body 12C should not be limited to a circular shape such as ordinary electrical bulbs. The device body 12C may have a polygonal section in order that the LED plate may reliably be attached to the device body 12C.

In the above-described illumination device 10C, the cap 15C can be engaged with the socket for a conventional electrical bulb, and the LEDs are used. Consequently, electric power consumption can be reduced as compared with the case where an electrical bulb or fluorescent bulb is used, whereupon the electric power rate can be saved.

Figure 15:
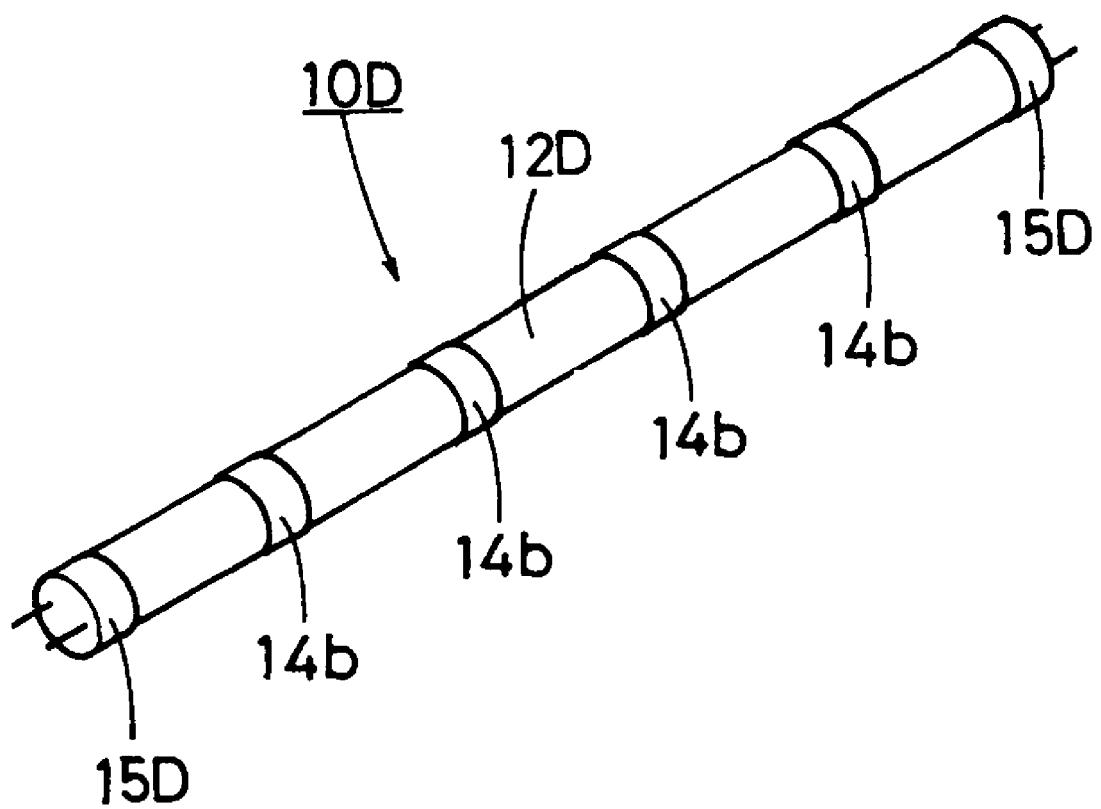
FIG. 15 is a perspective view of a device body formed in the semblance of a fluorescent lamp in the fourth embodiment.

FIG. 15 illustrates a fifth embodiment of the invention. The LED illumination device 10D of the fifth embodiment is applied to a fluorescent bulb housing for use in ordinary residence. The hook-loop fastener 14b is helically wound on and bonded to the device body 12D as shown in FIG. 15. A plurality of LED plates 11 connected to each other or one another as in the fourth embodiment are attached to the device body 12D. Since the LED illumination device 10D is similar to the fourth embodiment in the other respects, the description of the other respects of the LED illumination device 10D will be eliminated.

According to the LED illumination device 10, 10A, 10B, 10C or 10D of the invention, the LED plate 11 provided with plural LEDs are detachably attached via the hook-loop fasteners 14a and 14b to the device body 12, 12A, 12B, 12C or 12D. Accordingly, firstly, the socket previously provided in the illumination housing can be used. Secondly, since the LED plate is disposed on the device body 12, 12A, 12B, 12C or 12D, the space in the illumination housing can effectively be used. Thirdly, since the LED plate 11 is detachably attachable to the device body, the LED plate 11 can easily be fixed to the device body 12 and at the same time, minute adjustment of the location, angle, etc. of the LED plate can readily be carried out after fixation.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. An LED illumination device comprising:
   at least one LED plate including a plurality of LEDs provided on an upper surface of a flat substrate, the LED plate having an underside;
   a device body provided with a cap engageable with an illumination device socket provided at a predetermined installation location, the device body having an outer surface, the LED plate and the device body being connected to each other by an electrical cable;
   an applying portion formed on the underside of the LED plate; and
   a receiving portion formed on the outer surface of the device body, the applying portion of the LED plate being detachably applied to the receiving portion of the device body.

2. The LED illumination device according claim 1, wherein the applying and receiving portions comprise a hook-loop fastener.

* * * * *